United States Patent [19]

Kalnins

[11] Patent Number: 5,021,165

[45] Date of Patent: Jun. 4, 1991

[54] OIL AND WATER SEPARATING SYSTEM WITH HYDROCYCLONE AND FLOATATION DEVICE

[75] Inventor: Charles M. Kalnins, The Woodlands, Tex.

[73] Assignee: Conoco Specialty Products, Houston, Tex.

[21] Appl. No.: 449,830

[22] PCT Filed: Jun. 10, 1988

[86] PCT No.: PCT/AU88/00184

§ 371 Date: Dec. 8, 1989

§ 102(e) Date: Dec. 8, 1989

[87] PCT Pub. No.: WO88/09696

PCT Pub. Date: Dec. 15, 1988

[30] Foreign Application Priority Data

Jun. 10, 1987 [AU] Australia ............................ PI2388/87
Jun. 10, 1987 [AU] Australia ............................ PI2389/87
Dec. 24, 1987 [AU] Australia ............................ PI6104/87

[51] Int. Cl.$^5$ .................... B01D 17/035; B01D 17/038
[52] U.S. Cl. ..................................... 210/703; 210/202; 210/251; 210/512.1; 210/787; 210/806; 210/808
[58] Field of Search ................ 209/211; 210/251, 259, 210/512.1, 512.2, 703, 704, 787, 788, 804, 806, 175, 177, 294, 737, 702, 484, 198.1, 202, 808

[56] References Cited

U.S. PATENT DOCUMENTS

| 4,226,722 | 10/1980 | Jones | 210/484 |
| 4,482,459 | 11/1984 | Shiver | 210/725 |
| 4,627,922 | 12/1986 | Viator et al. | 210/704 |
| 4,935,154 | 6/1990 | Arnold | 210/801 |

FOREIGN PATENT DOCUMENTS

| 1143437 | 3/1985 | U.S.S.R. | 210/703 |
| 2094185 | 9/1982 | United Kingdom | 210/800 |
| 2101504 | 1/1983 | United Kingdom | 210/512.2 |
| 2162092 | 1/1986 | United Kingdom | 210/788 |
| 2190310A | 11/1987 | United Kingdom | 210/703 |
| 2191424 | 12/1987 | United Kingdom | 210/806 |

OTHER PUBLICATIONS

"Small-Scale Experiments on Hydrocyclones for Dewatering Light Oils", I. C. Smith, M. T. Thew, P. S. Debenham and D. P. Colman (International Conference on Hydrocycloner, Oct. 1–3, 1984, Paper I4.
"The Effect of Split Ratio on Heavy Dispersion Liquid–Liquid Separation in Hydrocyclones", Smith, Thew and Colman (2nd International Conference on Hydrocyclones, Sep. 19–21, 1984, Paper E2.
International Patent Publication, WO85/00760, Carroll et al, 2–1985.
WO 85/00851.
Patent 2,000,052, published 6–1978, GB.

Primary Examiner—Robert A. Dawson
Assistant Examiner—Joseph Drodge
Attorney, Agent, or Firm—John E. Holder

[57] ABSTRACT

A separation system for separating oil and water components of a liquid mixture wherein the oil component is comprised of droplets of a less dense phase in a more dense water phase. The mixture is fed to separation devices including a hydrocyclone for generally reducing the oil in water concentration to less than 500 ppm. The underflow of the hydrocyclone is passed to a downstream flotation device for further separation as by settling, which may be further assisted by liberating gas in the mixture, in the flotation device, to adhere such gas to oil droplets and thereby carry such droplets to the surface of the device. Pressure of fluids leaving the hydrocyclone may be reduced before entering the flotation device. A residence vessel upstream of the hydrocyclone may be provided to precoalese the mixture prior to entering the hydrocyclone.

27 Claims, 5 Drawing Sheets

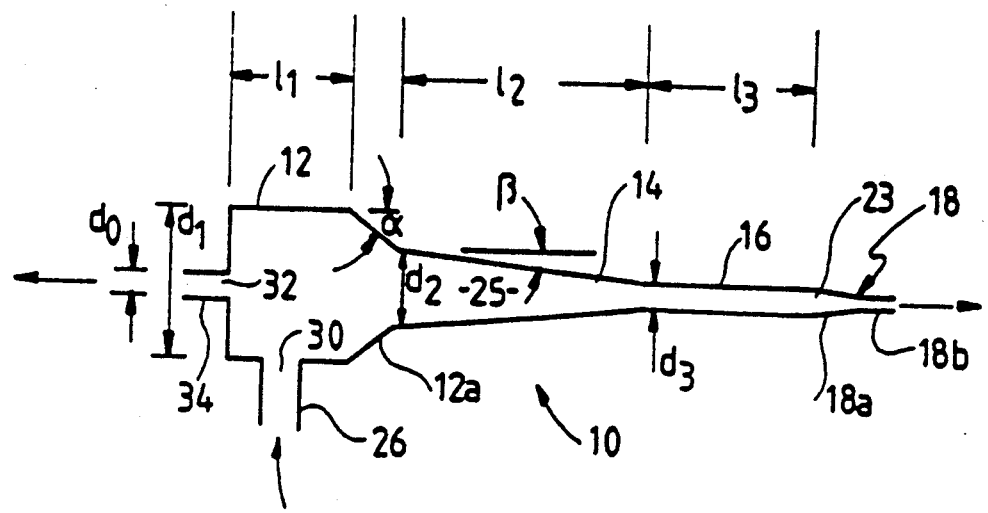
FIG·2
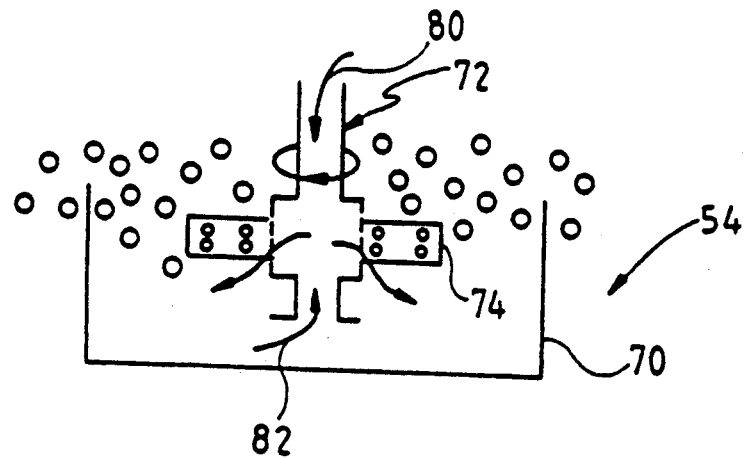
FIG·3

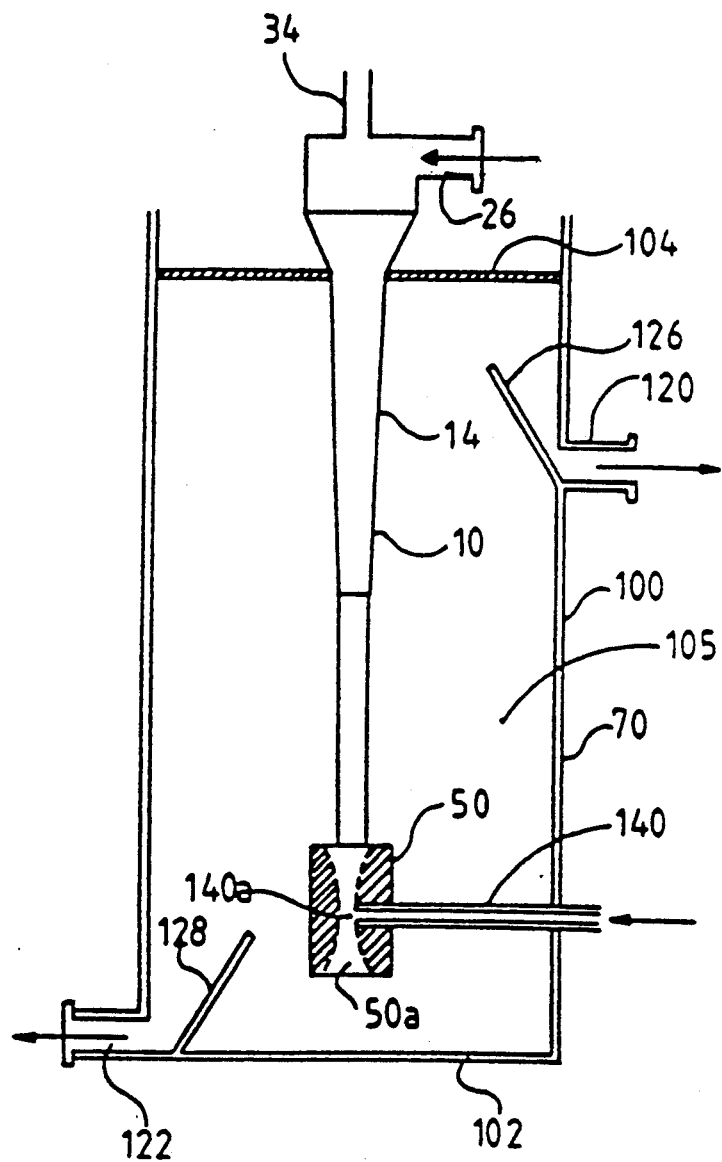
FIG·6

OIL AND WATER SEPARATING SYSTEM WITH HYDROCYCLONE AND FLOATATION DEVICE

This invention relates to a separator apparatus.

Flotation cells are used in industry for the purpose of separating particles from a liquid. These operate generally by admixing gas bubbles to the mixture to be separated, whereby the gas bubbles are brought into contact with the particles so that the gas bubble-particle entities are effectively lightened and rise to the surface of the mixture where they can be drawn off. To facilitate this action, chemical reagents may be added to the mixture.

It has also been discovered that flotation cells may be used for separating liquid phases one from the other, if one of the liquid phases be present in the form of discreet droplets, such as in an emulsion. However, it has been found that systems of this kind are only capable of satisfactory operation where the influent oil-in-water concentration does not exceed 500 ppm. One use, however, for oil-water separators lies in the cleaning up of residual water at oil wells, after removal of the principal oil concentration therefrom, such as in off-shore oil wells where the residual water must be decontaminated of residual oil to give a high water purity level before the water can, under environmental protection laws, be legally returned to the sea. In such instances, it is often impossible to maintain the influent oily water such that the concentration of oil therein is less than 500 ppm, with the result that unsatisfactory results are obtained, insofar as purity of the effluent water is concerned.

Similar considerations concerning the efficiency of operation of flotation cells of the types including means for introduction of gas bubbles and/or including agitation means apply in relation to efficiency of operation of "degassers" being a form of flotation cell not having provision for agitation of material being separated and not necessarily having provision of introduction of gas bubbles. In the latter, separation of gas and liquid and/or of liquid components is effected simply by gravitational settling. A so called "skimmer" is a form of degasser having provision for removal of free oil. The term "flotation device" is used in this specification to mean any device in which separation is effected by settling.

The invention generally envisages the use of a hydrocyclone to pre-condition a mixture before admission to a flotation device.

In one aspect, there is provided separator apparatus comprising a hydrocyclone having a separating chamber with an inlet for inlet of a liquid mixture to be separated, an overflow outlet for outlet of a less dense liquid component of the mixture and an underflow outlet for outlet of a more dense liquid component of said mixture, and a flotation device, such as a flotation cell coupled to receive outlet material from said underflow outlet. The hydrocyclone is in this case effective in use to effect a pressure reduction in the material emerging from said underflow outlet, as compared to pressure of said mixture at said inlet, whereby to facilitate any of said less dense component present in solution in said more dense component breaking out of solution to be either carried to said overflow outlet or to emerge from the underflow outlet with the more dense component, as droplets thereof in the more dense component, the flotation device being effective to effect separation of said droplets from the more dense component by adherence of gas thereto, to cause the less dense component to float to the surface of the material admitted to the flotation device.

The invention also provides a method for separating liquid components of a liquid mixture one from the other by use of a hydrocyclone to which the mixture is admitted, the hydrocyclone being operated whereby a less dense component of the mixture emerges from an outlet of the hydrocyclone in the form of droplets in a more dense component of the mixture, the material emerging from the outlet being admitted to a flotation device such as a flotation cell to effect separation by adherence of gas bubbles to the droplets to cause the less dense component to float to the surface of the admitted material.

The invention is further described by way of example only with reference to the accompanying drawings in which:

FIG. 2 is a diagram showing a hydrocyclone used in the apparatus of FIG. 1;

FIG. 3 is a diagram of a flotation cell used in the apparatus of FIG. 1; and

FIG. 6 is a diagram of another apparatus contstructed in accordance with the invention.

Figure 1:
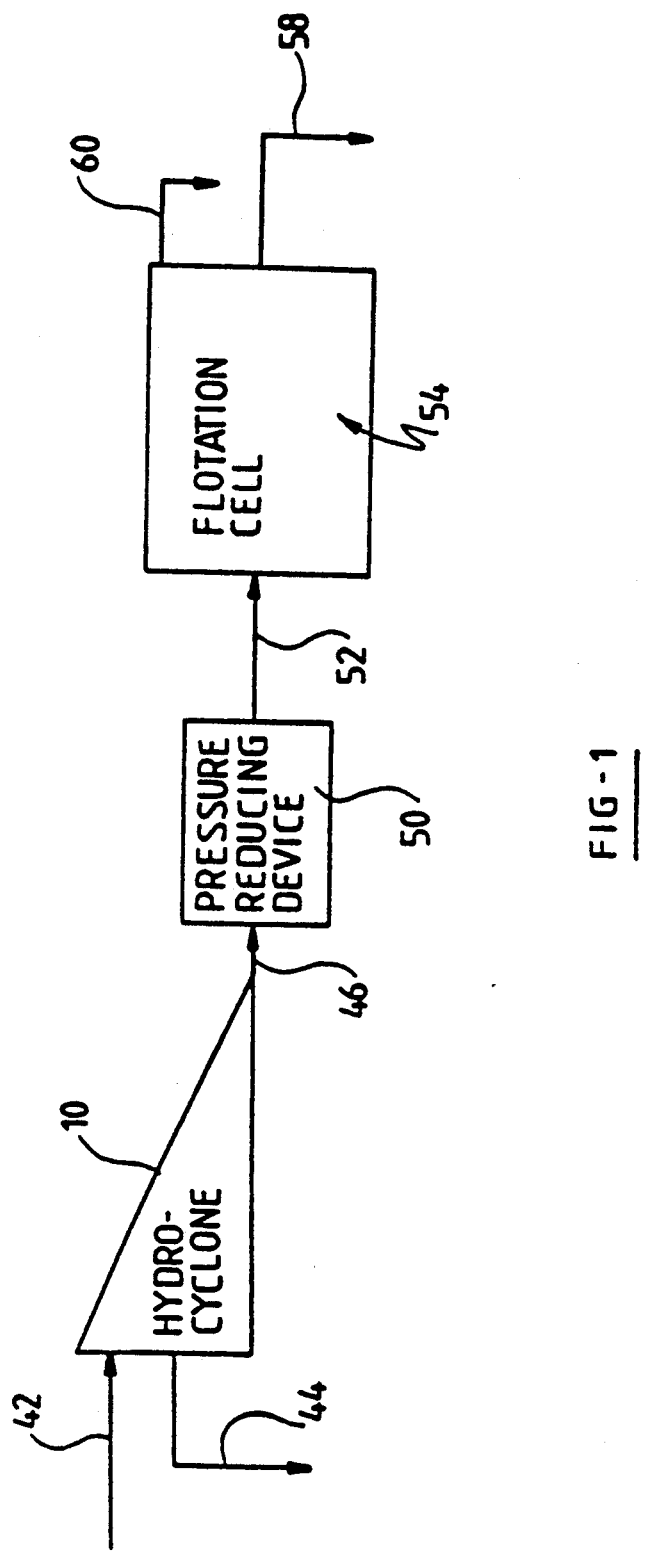
FIG. 1 is a flow diagram of an apparatus constructed in accordance with the invention.

The apparatus shown in FIG. 1 comprises a hydrocyclone 10 to which a mixture of oil in water is admitted, such as on the line 42 shown, to provide at an outlet line 44 separated oil and at an outlet line 46 separated water which may, however, still contain some residual oil. The water component is passed on line 46 through a pressure reducing device 50 and thence on a line 52 to a flotation cell 54. Here, further separation occurs with the water component being taken on a line 58 from the flotation cell and the oil component on a line 60 therefrom.

The hydrocyclone 10 may be constructed in known fashion, such as in accordance with the teachings of U.S. Pat. No. 4,237,006, Australian patent application No. 84713/79, or in my International applications Nos. PCT/AU83/00028 or PCT/AU85/00010. FIG. 2 shows, diagrammatically, a separator of this general type. This is shown as having a tapered elongate separating chamber 25 which is of circular cross-section having, at its larger diameter end, a first cylindrical portion 12, a tangential inlet 26 having an inlet opening 30, and an axial overflow outlet 34 which communicates with an outlet opening 32. A tapered portion 12a of separating chamber 25 is provided adjacent portion 12, this leading to a second, also slightly tapered, portion 14 of the separating chamber 25, this in turn leading to an elongate cylindrical portion 16 of the separating chamber which opens to an axial underflow outlet 23 for the separator.

Oily water mixture to be separated is passed on the inlet 26 through the inlet opening 30 into the portion 12 of the separating chamber 25 so as to generate a vortex within the separating chamber. The oil component emerges from the outlet 34 via opening 32 and the water component emerges from the underflow outlet 23.

As shown, the first portion 12 has a length $l_1$ and a diameter $d_1$, the second portion has a length $l_2$ and diameter $d_2$ at its larger diameter end, portion 16 has a length $l_3$ and a diameter $d_3$, whilst the overflow outlet has a diameter $d_0$. As described in Australian patent application No. 84713/79, two strictly tangential inlets 26 may for example be provided or, as shown in International application No. PCT/AU85/00010, a single inlet 26 of involute form may be provided.

In accordance with the abovedescribed construction, the cyclone separator may be constructed in accordance with any one or more or all of the following dimensional constraints.

$$l_2/d_2 > 10, \text{ such as } 10 < l_2/d_2 < 25$$

$$3 \leq \frac{\pi d_i d_2}{4A_i} \leq 30$$

$$\text{such as } 3 \leq \frac{\pi d_i d_2}{4A_i} \leq 20$$

$$d_0/d_2 \leq 0.25, \text{ such as } d_0/d_2 < 0.1$$
$$d_1 > d_2$$
$$d_2 > d_3$$

where $A_i$ is the total inlet area of all of the inlet openings combined or the inlet opening if there is only one. $\beta$, the half angle of the taper of the second portion, may be 20° to 2°, such as 1°. Portion 12a is optional. If provided, it may have a half angle, $\alpha$, of 10°.

Other suitable constructions for hydrocyclone 10 are shown, for example, in the specification of Australian patent application No. 77610/87 and of International applications Nos. PCT/AU87/00402, PCT/AU86/00313, PCT/AU86/00173 and PCT/AU85/00181.

In the construction shown in FIG. 2, the overflow outlet 23 communicates with a fourth portion 18 of the separator, which has the effect of providing a back pressure to facilitate the separating action. Such a fourth portion is described in International application No. PCT/AU83/00028 and may, as shown, comprise a first frustoconical portion 18a which leads from outlet 23 followed by a second cylindrical portion 18b. When used in the apparatus of FIG. 1, this arrangement provides a pressure reducing action and permits omission of the pressure reducing device 50, line 46 in that case, communicating directly with line 52 to admit material from the separator 10 directly to the flotation cell.

The flotation cell 54 may also be constructed in accordance with conventional practice and may be of the dissolved gas type or of the induced air or gas types. FIG. 3 shows, in diagrammatic form, one such form being of the induced air type. Here, a vessel 70 is provided into which the material to be separated is admitted. A rotor 72 is positioned within the vessel 70 and has impeller blades 74 in use rotated together with the impeller about a vertical axis. The design is such that air is drawn into the upper part of the rotor 72, as shown by arrow 80, and can then pass through perforations in the rotor sidewardly outwardly therefrom and into the material to be separated. At the same time, the rotor draws material in the vessel upwardly into the rotor, also to pass outwardly through the aforementioned perforations. Material so admitted is shown diagrammatically, by arrow 82. In this arrangement, the air emerging from the rotor at the side openings thereof is in the form of bubbles which adhere to a desired one of the components to be separated so that that component is effectively lightened, whereby to float to the surface of the material within the vessel 70. This action may be facilitated by addition of suitable chemicals, such as surfactants. The means for admitting and removing the mixture to be separated, and the resultant separated components, is not shown, but the line 52 may communicate directly with the interior of the vessel 70, with the outlet for the downwardly settling component located towards the base of the cell to be taken off as desired. The component which rises to the surface may simply overflow the sides of the cell to be collected for take off in a suitable peripheral channel. In the present context, the cell 54 is arranged whereby the component which floats to the top of the vessel is oil, and that which settles is water.

Figure 4:
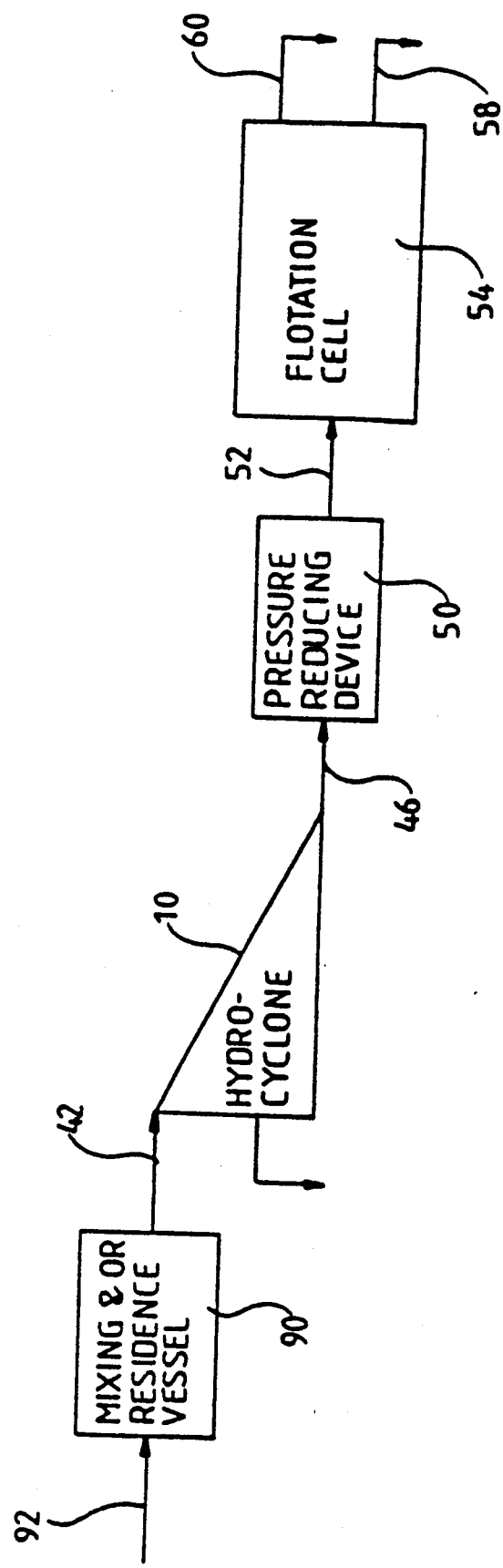
FIG. 4 is a diagram illustrating a modification of the invention.

As shown in FIG. 4, the liquid mixture to be separated may also be passed on a line 92, in the first instance, to a mixing and/or residence vessel 90, before admission to the hydrocyclone. The remainder of the arrangement of FIG. 4 is the same as that in FIG. 1 and like reference numerals in FIGS. 1 and 4 denote like components.

The mixing and/or residence vessel may comprise a precoalescer or coalescer, for example a cross-plate interceptor skimmer. It is also possible in some instances to facilitate operation by positioning a low shear pressure increasing device, such as a suitable pump, either in line 92, to act on the inlet mixture prior to entering the vessel 90, or on line 42 to act on mixture having left vessel 90 prior to entry with hydrocyclone 10.

Where the vessel 90 is provided provision may be made for inlet thereto, separtely or in admixture with liquid on line 92, of heated water or other fluid, such as from a heater treater device. Such device may effect injection of heated water periodically.

The hydrocyclone 10 acts, as described, to effect removal of an oil component from an oily-water mixture when admitted thereto. Generally, the separator 10 is designed for use where there is a substantially smaller amount of oil than water in the incoming mixture. However, the concentration of oil may be of the order of several percent for example.

The hydrocyclone 10 is able to reduce the oil concentration to a quite low level in the water component which emerges from the outlet thereof, such as below 500 ppm. Then, after passage through the pressure reducing device 50 or through the portion 18 of the described hydrocyclone, the oily water as then passed to the flotation cell is further separated to reduce the oil component to an even lower level. Thus, the emergent water from line 58 may be relatively very pure indeed, such as having an oil concentration of only a few parts per million.

The provision of the hydrocyclone 10, in addition to providing a separating action, also assists in that a substantial pressure drop will normally exist as between the inlet line 42 and the outlet 23 from the separator. This reduction in pressure, which may be example be 50%, has the effect that oil in solution in the water will tend to come out of solution and form droplets which, even if they are not separated totally in the cyclone 10 to emerge from the outlet line 44, and can be more readily agglomerated together or are otherwise more readily capable of adherence by the bubbles in the flotation cell to effect final separation.

The described flotation cell is exemplary and may be replaced by other types such as types not having the described impeller blades 74 or rotor 72. Furthermore, as mentioned, the flotation cell may be replaced by other flotation devices such as degassers or skimmers.

Figure 5:
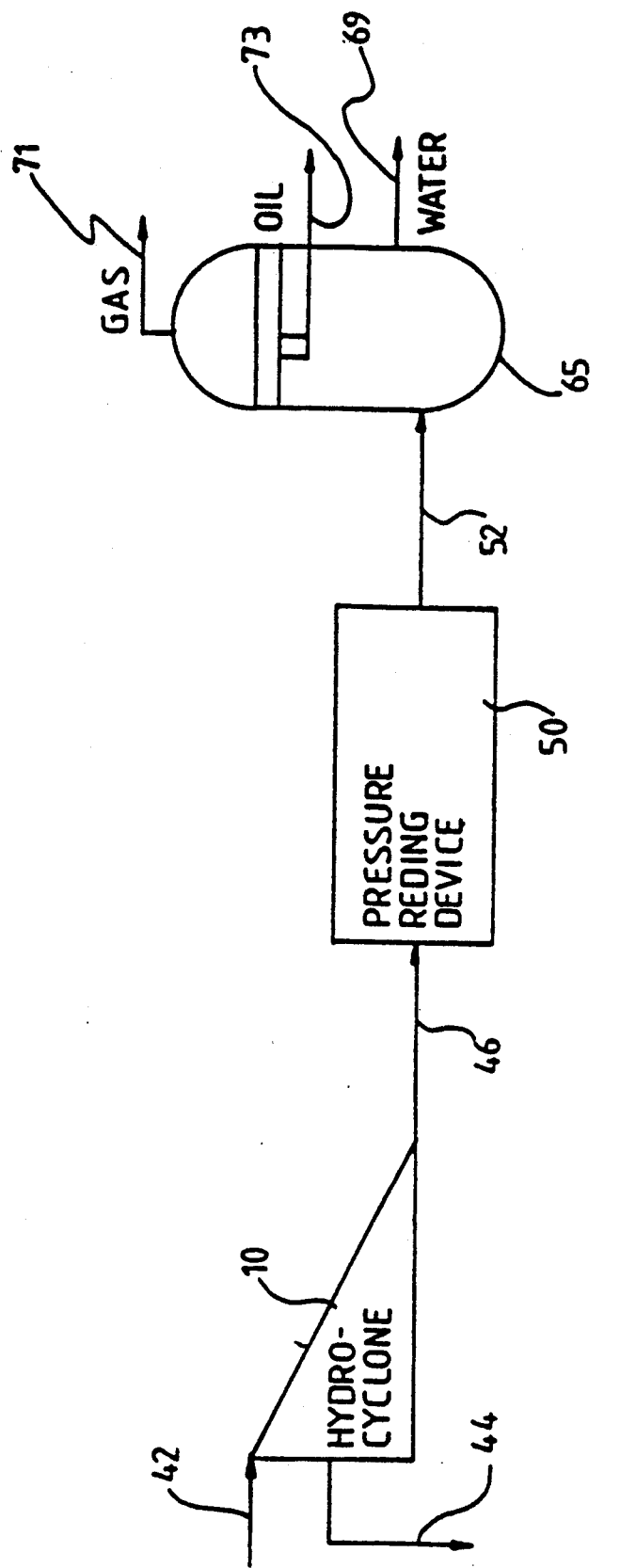
FIG. 5 is a diagram illustrating a further modification of the invention.

FIG. 5 shows an arrangement in which outlet from the described hydrocyclone 10 is taken on line 46, optionally, via the pressure reducing device 50, to a degasser 65 such as a skimmer (degasser with a provision for removal of free oil). The liquid from the underflow outlet of the hydrocyclone is passed on line 52 to the inlet of the degasser. The degasser is in the form of a closed vessel 68, for example, pressurised and acts to separate gas from water in the incoming liquid and, furthermore to separate oil from the water, the separations being effected at least in part by gravitational settling. The water component may be removed from the bottom of the vessel 68 on the line 69 shown and the gas from the top of the vessel by a line 71. The oil may be removed from the top of the water in the vessel on a line 73, optionally aided by a suitable mechanical "skimmer".

The pressure reducing device 50, although preferable, may be omitted in some instances, as indicated. It is also possible to use, as the pressure reducing device, a suitable valve, or if desired, another hydrocyclone, particularly one designed to remove solids from admitted liquid.

In the apparatus of FIG. 6, the flotation cell 70 has a cylindrical outer wall 100, arranged with its axis vertical. The wall 100 is closed at the lower end by a base 102 and, at its upper end, by a transverse wall 104 to define a substantially closed chamber 105. In this instance, the hydrocyclone 10 is disposed with its axis vertical and arranged to extend downwardly into the interior of the cell 70. The larger diameter end of the hydrocyclone, including the inlet 26, is positioned above wall 104, the portions 14 and 16, however, extending into the interior of the cell 70, coaxially with the axis of the wall 100. At the lower end, the underflow outlet of the hydrocyclone 10 is fitted with a suitable pressure reducing device 50. In this case, the device is in the form of a venturi having a central passageway 50a therethrough. The exit from passageway 50a is disposed a short distance above the upper surface of the base 102 of the cell 70.

An upper manifold 120 is positioned to provide an outlet opening for light phase separated material from the chamber 105 of the cell 70 and a further manifold 122 is positioned adjacent the lower end of the cell 70 for outlet of heavy phase separated material. As shown, baffles 126, 128 may be provided in the interior of the cell 70 adjacent the manifolds 120, 122.

Provision is made for injecting air or gas into the apparatus as shown. In this case, an inlet pipe 140 extends through the side wall 100 and opens to an outlet opening 140a in the passageway 50a through the device 50. This outlet opening 140a is positioned at the point of smallest diameter of the passageway 50a.

As shown, the hydrocyclone 10 may extend through an opening in wall 104 whereby the hydrocyclone is supported by the wall 104 at the junction between portions 12a and 14. The overflow outlet 34 may be provided, as before, in an axially arranged position relatively to the hydrocyclone 10, at the larger diameter end thereof.

In use of the apparatus of FIG. 6, the liquid mixture to be separated is fed to the hydrocyclone 10, inwardly through the inlet 26 so that at least the heavier of the phases to be separated the mixture is passed axially downwardly along the interior of the hydrocyclone, thence passes through the pressure reducing device 50 and enters the chamber 105. The material so passing through the hydrocyclone and pressure reducing device 50 has air or gas injected thereinto via the pipe 140 and opening 140a. Within chamber 105, the liquid emerging from the outlet 50a fills until it overflows the baffle 126. The lighter of the separated phases moves to the surface and is thus taken off via the mainfold 120, whilst the heavier material settles to the bottom and is taken off past the baffle 128 through manifold 122.

In the described arrangement, the hydrocyclone 10 may make an initial separation of phases to remove some of the lighter phase through the overflow outlet 34, but the hydrocyclone could be operated so as it does not perform a significant separating action, of itself, in which case the outlet 34 may be dispensed with.

The pressure reducing device 50 may be of any suitable form and may not necessarily be in the form of a venturi. A suitable valve or nozzle, may, for example, be employed. The air or gas may be induced or inducted into the liquid to be separated in ways other than described. For example, the air or gas may be injected upstream of the device 50 if desired. It is preferred that the device 50, however, be adjustable so as to permit a variation of flow therethrough.

The described arrangement has been advanced merely by way of explanation and many modifications may be made thereto without departing from the spirit and scope of the invention as defined in the appended claims.

What is claimed is:

1. Separator apparatus for separating oil and water components of a fluid mixture wherein the oil component is comprised of droplets and wherein it is desired to ultimately provide a water component which is substantially free of oil; comprising a hydrocyclone designed, constructed and arranged to effect separation of an oil component from a water component of an inletted fluid mixture having a separating chamber with an inlet means for inlet of the fluid mixture to be separated, an overflow outlet means for outlet of a less dense oil component of the mixture and an underflow outlet means for outlet of a material comprised of a more dense water component of said mixture having residual droplets of oil, a flotation device means coupled to receive the outlet material from said underflow outlet for further separation of the oil component from the more dense water component by flotation of the less dense component to the surface of said flotation device, said overflow outlet being arranged so that the oil component outletting therefrom is directed through a flow path that is outside the flotation device, and means on said flotation device for separate removal therefrom of each of the oil and water components separated therein.

2. Separator apparatus as claimed in claim 1 wherein pressure reducing means outside the hydrocyclone are provided to reduce pressure of the material passed from the hydrocyclone to the flotation device.

3. Separator apparatus for separating oil and water components of a fluid mixture comprising a hydrocyclone designed, constructed and arranged to effect separation of an oil component from a water component of an inletted fluid mixture having a separating chamber with an inlet means for inlet of the fluid mixture to be separated, an overflow outlet means for outlet of a less dense oil component of the mixture and an underflow outlet means for outlet of a material comprised of a more dense water component of said mixture having residual droplets of oil, a flotation device coupled to receive outlet material from said underflow outlet, and further including means to effect a pressure reduction in the material emerging from said underflow outlet so that the outlet material entering said flotation device is at a pressure which is less than that of the outlet material after such outlet material has outletted from the underflow outlet, the flotation device being effective to effect separation of said droplets in the outlet material from the more dense component to cause the less dense component to float to the surface of the material admitted to the flotation device.

4. Separator apparatus as claimed in claim 1 or 3 wherein said flotation device is provided with means for introducing into the mixture therein, materials to coalesce components of the mixture.

5. Separator apparatus as claimed in claim 1 or 3 wherein said flotation device comprises a chamber arranged for separation of said components by setting of the more dense water component whereby the less dense oil component is positioned thereabove, said hydrocyclone extending into said vessel whereby said outlet material is passed from said underflow outlet to the chamber for separation.

6. Separator apparatus as claimed in claim 5 wherein means is provided for entraining gas in the material emerging from said underflow outlet, said means including a port in a passageway between said underflow outlet and the interior of said chamber, and means for causing said gas to emerge from said port into the passageway for admixture with said outlet material as it passes through the passageway.

7. Separator apparatus as claimed in claim 6 wherein said passageway comprises a passageway in a pressure reducing device for reducing pressure of said outlet material prior to entering said chamber.

8. Separator apparatus as claimed in claim 5 wherein said chamber is provided with a lower outlet for outlet of said more dense component and an upper outlet for outlet of said less dense component and further wherein said hydrocyclone extends downwardly through an upper transverse closure wall of the chamber whereby said inlet and overflow outlet of the hydrocyclone are disposed exteriorly of the chamber.

9. Separator apparatus as claimed in claim 1 or 3 wherein said hydrocyclone is of a configuration which will effect separation of the oil and water components of the mixture inletted to the hydrocyclone to the extent that material admitted to said flotation device from the underflow outlet of said hydrocyclone, has a concentration of less than 500 ppm of oil in the more dense water phase.

10. Separator apparatus as claimed in claims 1 or 3 and further including means arranged to entrain gas into outlet material passing into said flotation device.

11. The separator apparatus of claim 1 or 3 wherein means is provided for entraining gas in the material in said flotation device.

12. The separator apparatus of claims 1 or 3 wherein said flotation device is housed in a separate vessel apart from said hydrocyclone and which is connected to said hydrocyclone by means of a flow line having a pressure reducing means in said flow line effective to reduce the pressure of materials emerging from the outlet of said hydrocyclone.

13. Separator apparatus as claimed in claims 1 or 3 further comprising a residence vessel having an inlet for the fluid mixture to be separated, and an outlet, the outlet being coupled to the inlet of the hydrocyclone, said residence vessel being designed to promote coalescence in part of at least one component of the mixture.

14. Separator apparatus as claimed in claim 13 wherein provision is made, in said residence vessel, for inlet into the fluid mixture therein of heated fluid.

15. A method for separating oil and water components of a fluid mixture one from the other by use of a hydrocyclone having an inlet means through which the mixture is admitted, an underflow outlet, and an overflow outlet, the hydrocyclone being operated whereby a less dense oil component of the mixture emerges from the underflow outlet of the hydrocyclone in the form of a material comprising oil droplets dispersed in a more dense water component of the mixture, admitting the material emerging from the underflow outlet to a flotation device to effect further separation of the mixture by adherence of gas bubbles to the oil droplets to cause the less dense component to float to the surface of the admitted material and directing material from the overflow outlet in a flowpath which is not in direct communication with the flotation device to which the underflow material is admitted.

16. A method as claimed in claim 15 wherein the mixture emerging from the hydrocyclone underflow outlet is passed through a pressure reducing device before entering said flotation device.

17. A method as claimed in claim 15 wherein gas is introduced into said material entering said flotation cell.

18. A method as claimed in claim 17 wherein the pressure of said material is reduced by passing such material through a passageway.

19. A method as claimed in claim 18 wherein the flotation device comprises a chamber for receiving said material and within which said separation by adherence of gas bubbles occurs, an outlet end of said passageway being positioned within the material in the chamber.

20. A method as claimed in claim 13 wherein the pressure of said material is reduced prior to its entering said flotation device.

21. A method for separating oil and water components of a fluid mixture one from the other by use of a hydrocyclone to which the mixture is admitted, the hydrocyclone being operated whereby a less dense component of the mixture emerges from an outlet of the hydrocyclone in the form of a material comprising oil droplets dispersed in a more dense water component of the mixture, the material emerging from the outlet being admitted via a flowline to a flotation device to effect further separation by settling, wherein the less dense oil component is caused to float to the surface of the admitted material, and reducing the pressure of the material emerging from the outlet as the material passes through a flowline prior to its admission to the flotation device.

22. A method as claimed in claim 15 or 21 wherein said mixture is passed to a residence vessel before passing to the hydrocyclone, for coalescing in part at least one component of the mixture.

23. A method as claimed in claim 22 and further comprising inletting into the residence vessel heated fluid to mix with the materials therein.

24. A method as claimed in claim 15 or 21 comprising introducing into the mixture passing into said flotation device, materials to coalesce the mixture.

25. A method as claimed in claim 15 or 21 wherein the flotation device comprises a chamber having upper and lower outlets at respective upper and lower locations on said chamber for outletting separated more dense and less dense components of the mixture and further comprising removing the separated more dense component from a lower location of said chamber and removing the separated less dense component from an upper location in said chamber, and in addition wherein provisions are made for injecting gas into the mixture within the flotation device and further comprising entraining gas within the mixture in the flotation device to effect further separation of the oil and water components thereof.

26. The method as claimed in claim 15 or 21 and further including, during separation within the hydrocyclone, reducing the concentration of oil droplets in water in the material emerging from the outlet of the hydrocyclone, to a level of concentration of oil in water less than 500 ppm.

27. The method of claim 26, and further including, further reducing pressure on the material admitted to the flotation device to facilitate further separation of the material by the adherence of gas bubbles to the oil droplets to cause the less dense oil component to float to the surface of the admitted material.

* * * * *

UNITED STATES PATENT AND TRADEMARK OFFICE
CERTIFICATE OF CORRECTION

PATENT NO. : 5,021,165

DATED : June 4, 1991

INVENTOR(S) : Charles M. Kalnins

It is certified that error appears in the above-identified patent and that said Letters Patent is hereby corrected as shown below:

<u>Col. 8</u>

Claim 17, line 2 "cell" should be --device--.

Signed and Sealed this

Nineteenth Day of January, 1993

*Attest:*

DOUGLAS B. COMER

*Attesting Officer*     *Acting Commissioner of Patents and Trademarks*